(12) United States Patent
Tajima et al.

(10) Patent No.: US 9,446,740 B2
(45) Date of Patent: Sep. 20, 2016

(54) WINDSHIELD WIPER ASSEMBLY

(71) Applicant: Mitsuba Corporation, Kiryu-shi, Gunma (JP)

(72) Inventors: Tetsuya Tajima, Novi, MI (US); Takamichi Iizuka, Yokohama (JP)

(73) Assignee: Mitsuba Corporation (JP)

( * ) Notice: Subject to any disclaimer, the term of this patent is extended or adjusted under 35 U.S.C. 154(b) by 313 days.

(21) Appl. No.: 14/027,554

(22) Filed: Sep. 16, 2013

(65) Prior Publication Data

US 2015/0074933 A1    Mar. 19, 2015

(51) Int. Cl.
*B60S 1/06* (2006.01)
*B60S 1/16* (2006.01)
*H02K 5/22* (2006.01)
*B60S 1/04* (2006.01)

(52) U.S. Cl.
CPC .............. *B60S 1/166* (2013.01); *B60S 1/0427* (2013.01); *H02K 5/22* (2013.01); *B60S 1/0433* (2013.01)

(58) Field of Classification Search
CPC .. B60S 1/0419; B60S 1/0422; B60S 1/0427; B60S 1/166; B60S 1/16; H02K 5/22; H02K 5/225
USPC ............. 15/250.3, 250.31; 296/96.15, 96.17; 310/83, 89
See application file for complete search history.

(56) References Cited

U.S. PATENT DOCUMENTS

| | | | | |
|---|---|---|---|---|
| 5,142,941 A | * | 9/1992 | Amann | B60S 1/0427 15/250.3 |
| 5,222,706 A | * | 6/1993 | Hoshino | B60S 1/0427 15/250.31 |
| 5,873,280 A | * | 2/1999 | Kanazawa | B60S 1/0427 15/250.3 |
| 8,819,888 B2 | * | 9/2014 | Iizuka | B60S 1/0427 15/250.27 |
| 2004/0140687 A1 | * | 7/2004 | Kalchschmidt | B60S 1/0488 296/96.17 |
| 2008/0189895 A1 | * | 8/2008 | Bruneau | B60S 1/0469 15/250.31 |

FOREIGN PATENT DOCUMENTS

DE  102008041270 A1  *  2/2010
GB      2219932 A    * 12/1989

* cited by examiner

*Primary Examiner* — Gary Graham
(74) *Attorney, Agent, or Firm* — Harness, Dickey & Pierce, P.L.C.

(57) ABSTRACT

A windshield wiper assembly for a vehicle includes a wiper motor. The wiper motor has a housing having a top surface and a side surface, a projection projecting from the top surface, a mounting bracket integrally extending from the side surface, and a rib integrally extending from the top surface and between the projection and a longitudinal end of the mounting bracket. Advantageously, the rib enhances the robustness of the housing so that it is more tolerant of stresses experienced during use.

12 Claims, 7 Drawing Sheets

WINDSHIELD WIPER ASSEMBLY

BACKGROUND

The present invention relates to a vehicle windshield wiper assembly.

Figure 6:
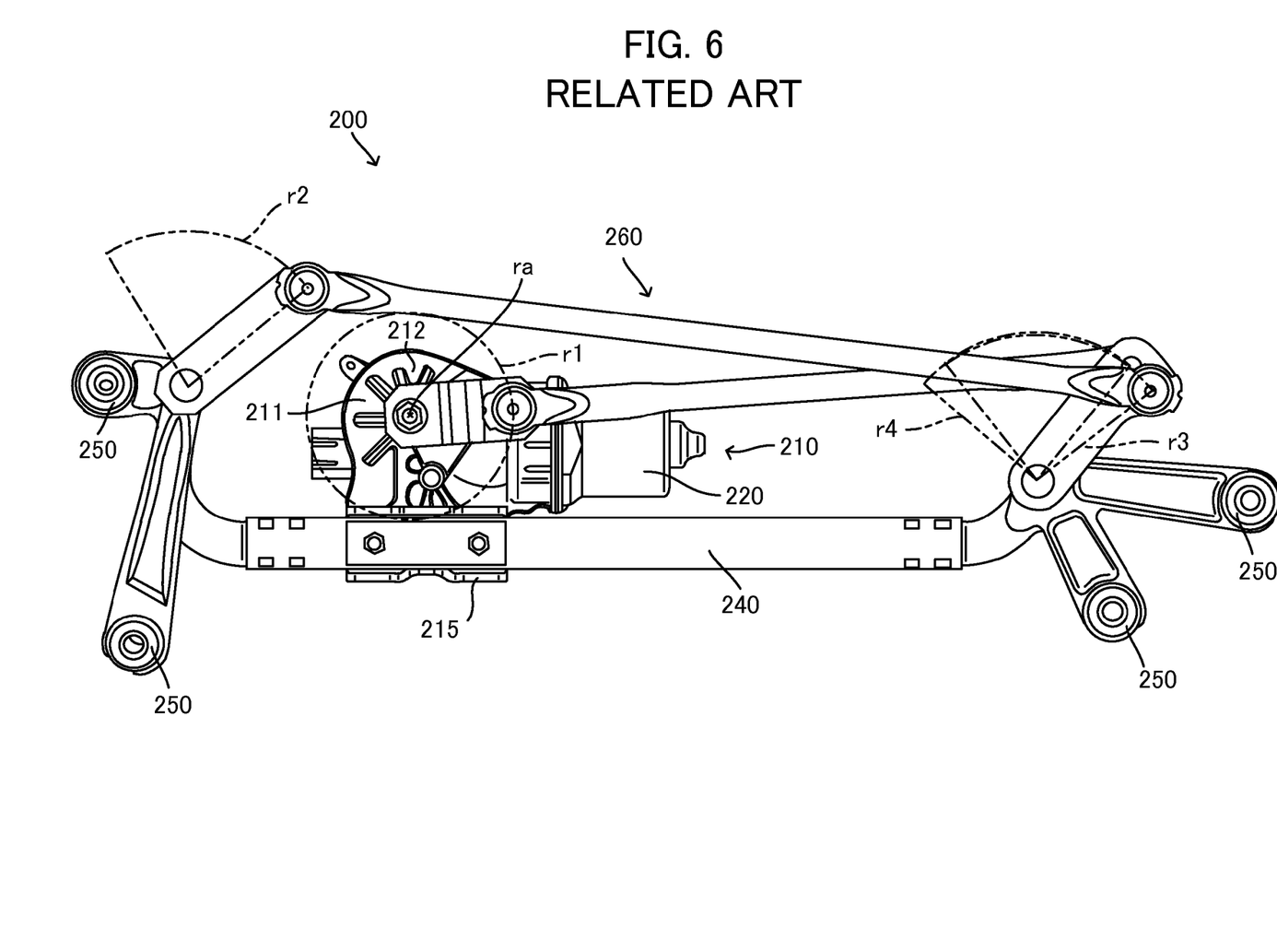
FIG. 6 is a front view of a windshield wiper assembly according to the related art.
Figure 7:
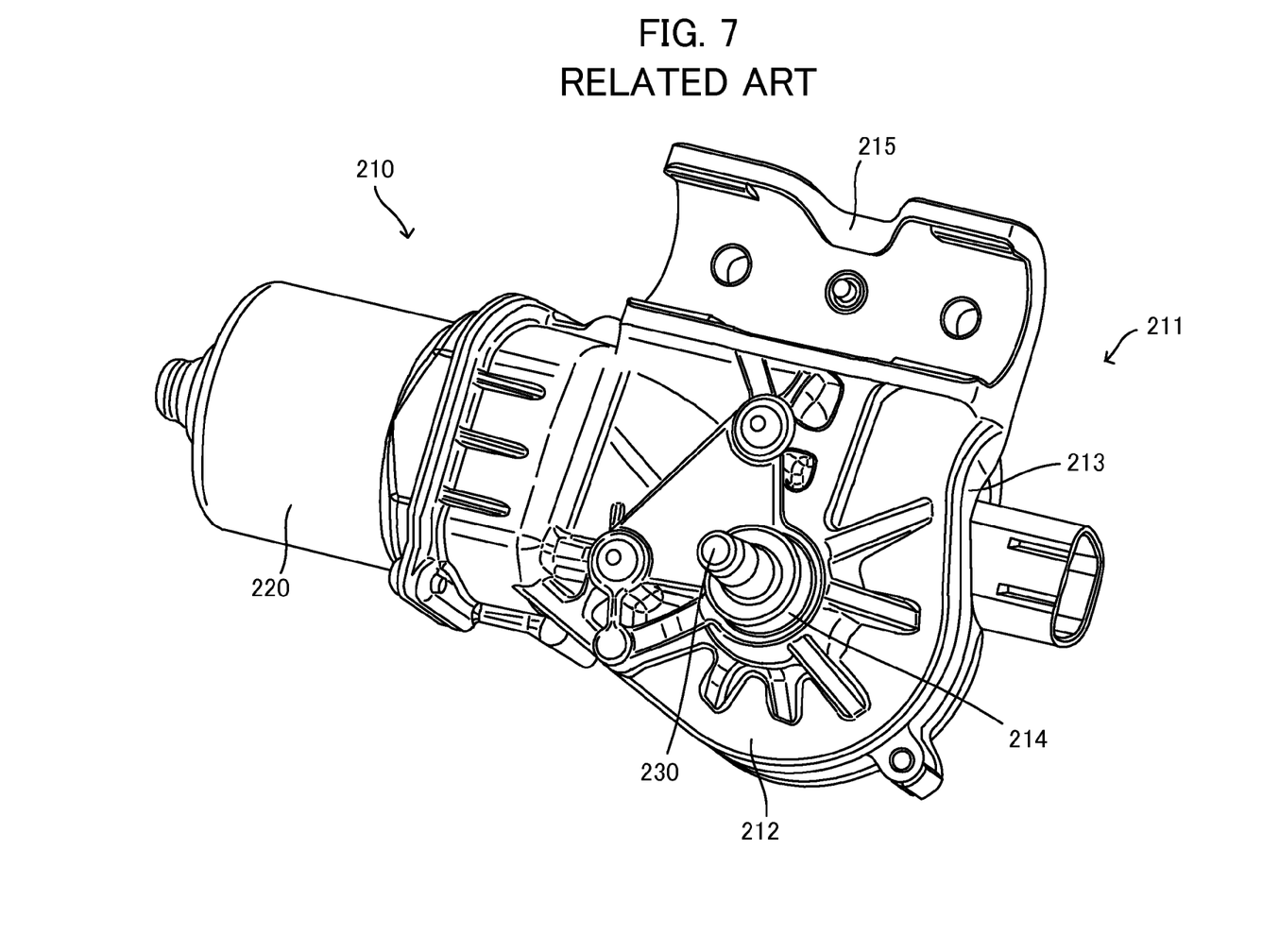
FIG. 7 is a perspective view of a wiper motor according to the related art.

Referring to FIGS. 6 and 7, a conventional windshield wiper assembly 200 typically includes a wiper motor 210, one or more wiper blades secured to wiper arms, and a pivotable linkage mechanism therebetween.

The wiper motor 210 has a housing 211 and a motor 220 which is connected to the housing 211. The housing 211 has a top surface 212 and a side surface 213. A projection 214 extends from the top surface 212. The projection 214 pivotally supports an output shaft 230 of the wiper motor 210. When the wiper motor 210 is driven, the output shaft 230 rotates in a predetermined direction r1.

The wiper motor 210 has a mounting bracket 215 integrally formed with the side surface 213. The mounting bracket 215 is attached to a bar when mounted within a vehicle. The wiper assembly 200 is mounted to the vehicle at mounting parts 250. A link mechanism 260 which is attached to the output shaft 230 moves back and forth in predetermined ranges r2, r3 and r4 due to rotation of the wiper motor 210. As a result, the wiper arms reciprocate along a windshield.

When the wiper motor 210 rotates while under the influence of obstacles such as snow, sleet, and the like at or near the end-of-stroke reverse positions, the load on the link mechanism 260 becomes high. As a result, each part of the wiper assembly 200 undergoes considerable stress. In particular, the housing 211 of the wiper motor 210 becomes highly stressed at the top surface 211, the side surface 212 and the mounting bracket 215.

SUMMARY

One aspect of the invention overcomes many limitations and disadvantages of a conventional windshield wiper assembly for use in connection with the vehicle. For example, this windshield wiper assembly includes a wiper motor including a housing having a top surface and a side surface, a projection projecting from the top surface, a mounting bracket integrally extending from the side surface, and a rib integrally extending from the top surface and from the projection to a longitudinal end of the mounting bracket. Advantageously, by having the rib on the housing, the housing is more robust and stress resistant than the conventional windshield wiper assembly.

DESCRIPTION OF EXEMPLARY EMBODIMENTS

Embodiments of the invention will be explained with reference to the drawings.

Figure 1:
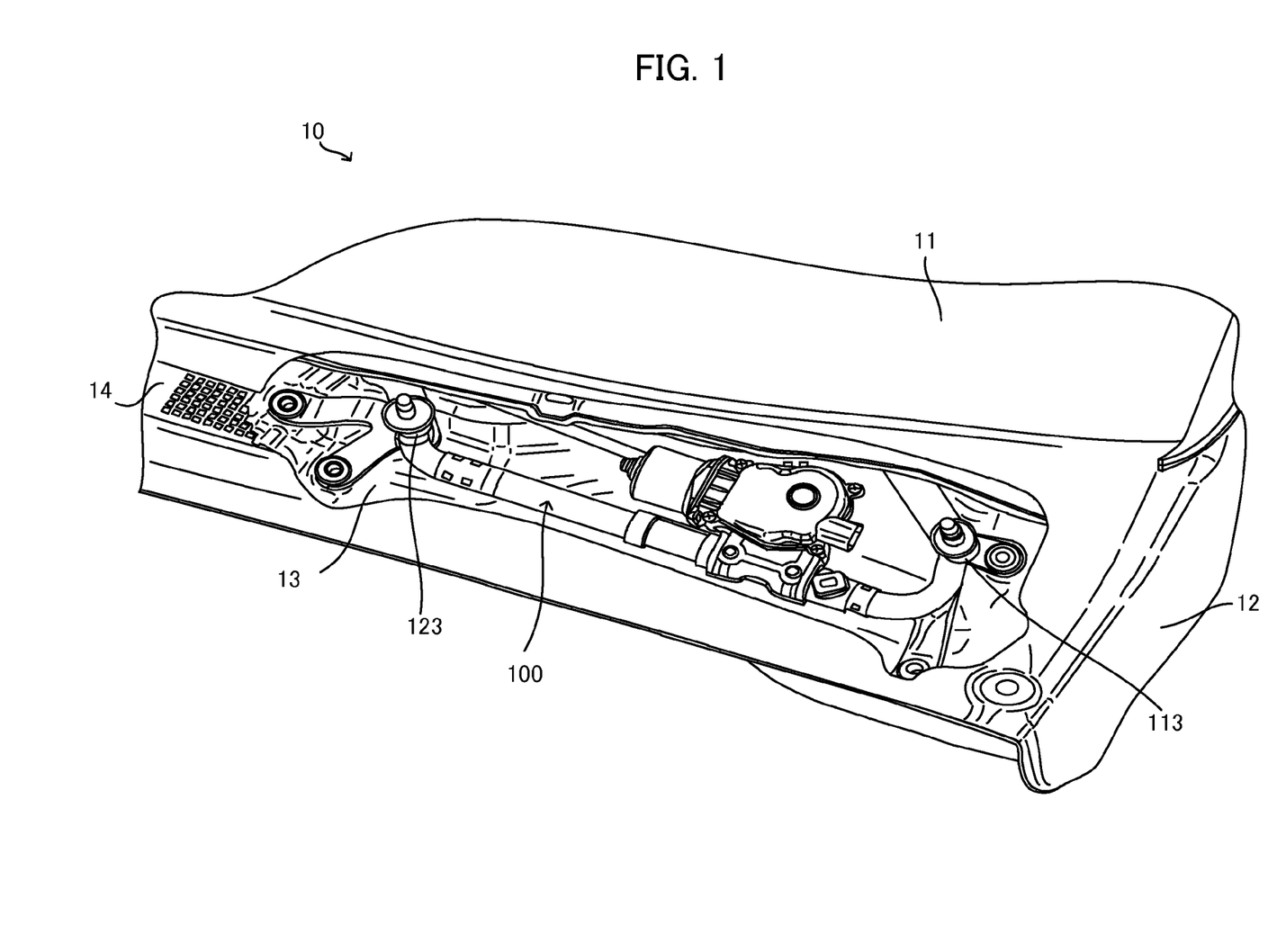
FIG. 1 is a perspective view of a cut away cowl cover plate which shows a windshield wiper assembly in the mounted state according to an embodiment of the present invention.

As shown in FIG. 1, a vehicle 10 includes a windshield 11 and a body panel 12. The body panel 12 includes a cowl box 13 and a cowl cover plate 14 which covers the cowl box 13. A windshield wiper assembly 100 is mounted within the cowl box 13.

Figure 2:
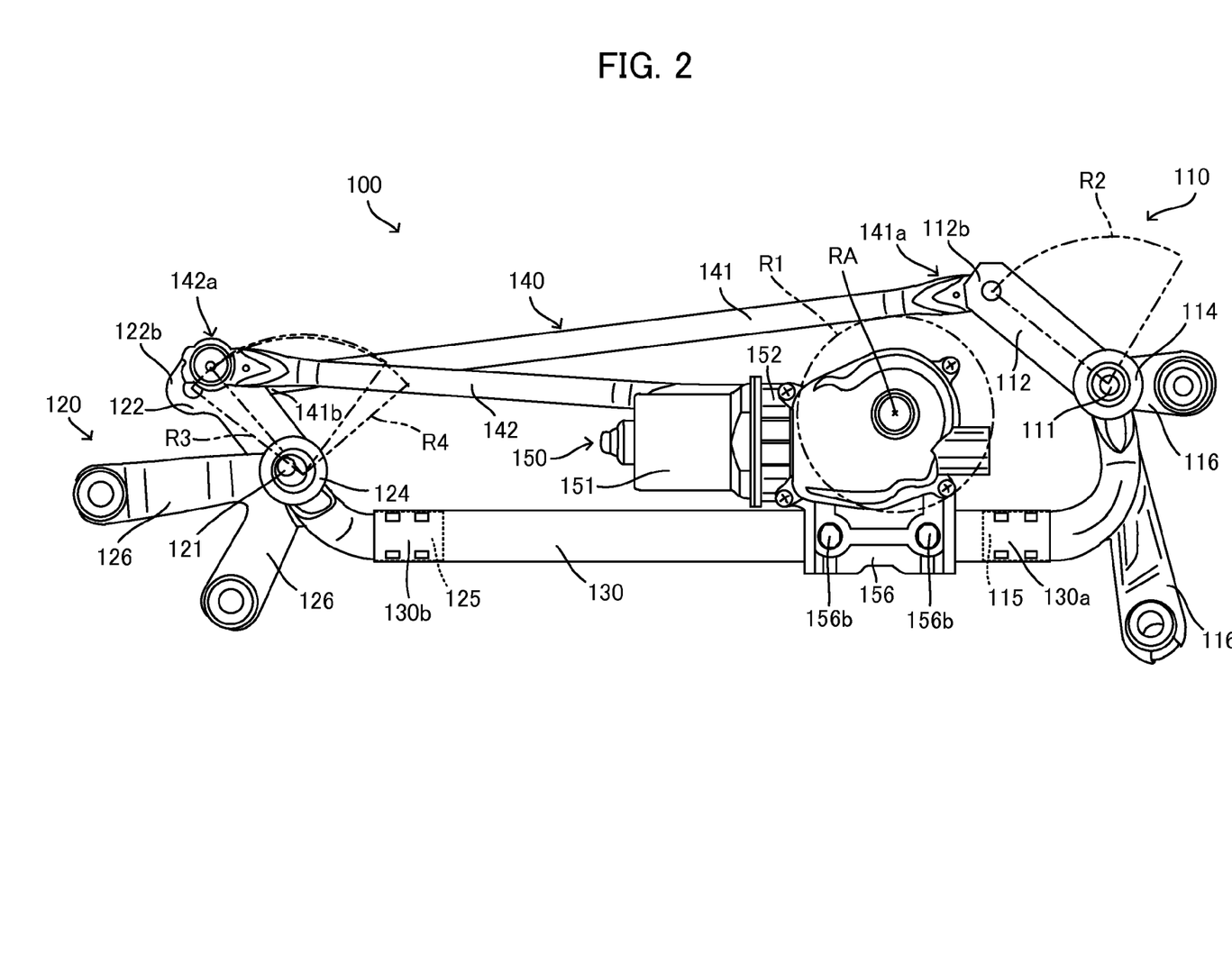
FIG. 2 is a front view of a wiper windshield assembly according to an embodiment of the present invention.
Figure 3:
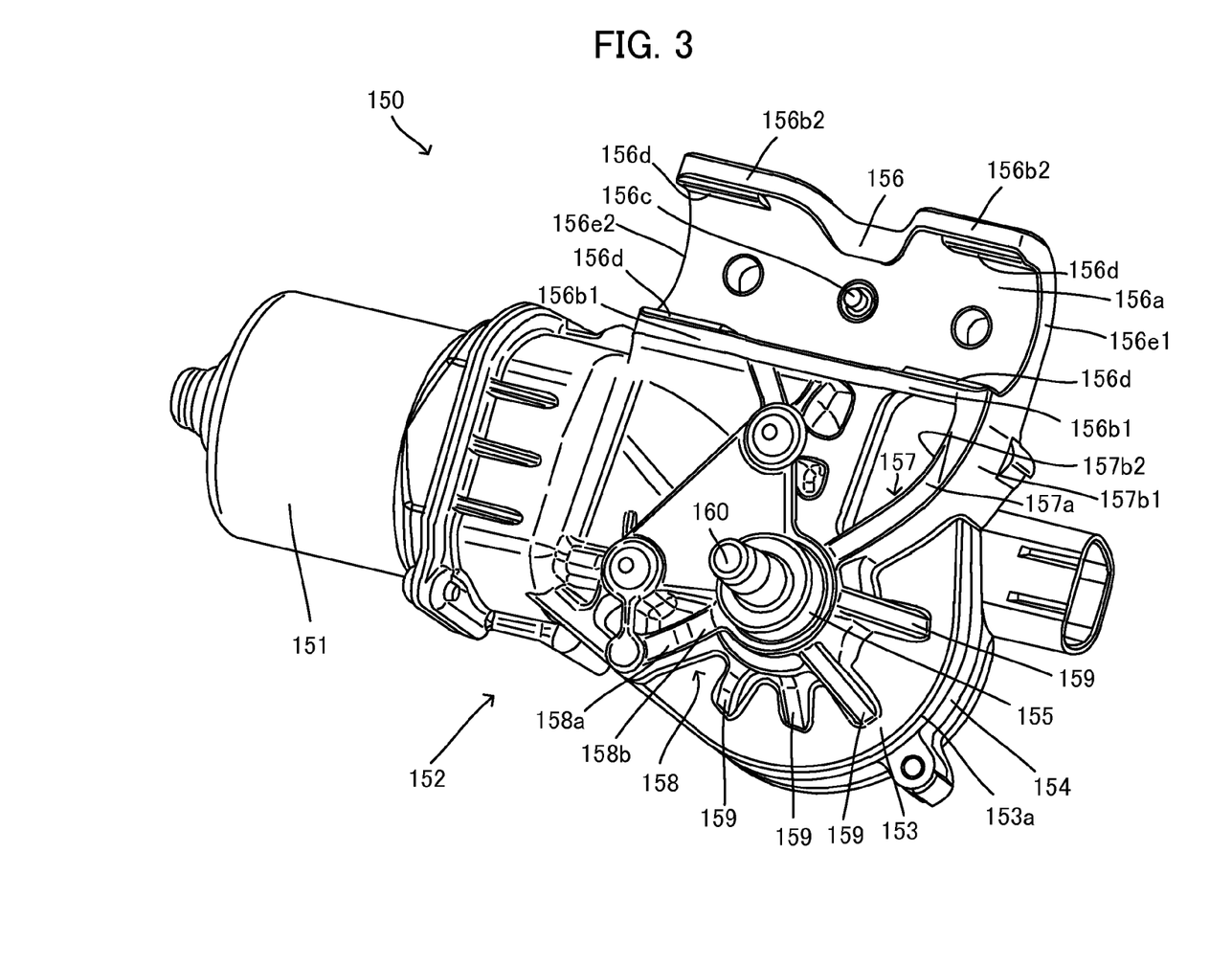
FIG. 3 is a perspective view of a wiper motor of the present invention.

As shown in FIGS. 1 to 3, the wiper assembly 100 includes a first pivot assembly 110, which includes a first pivot shaft 111, a first pivot lever 112, a first shaft supporting portion 113, a first pivot cap 114, a first bar coupling portion 115, and first body mounting parts 116, 116.

Also, the wiper assembly 100 includes a second pivot assembly 120, which includes a second pivot shaft 121, a second pivot lever 122, a second shaft supporting portion 123, a second pivot cap 124, a second bar coupling portion 125, and second body mounting parts 126, 126. Further, the wiper assembly 100 includes a bar 130 and a link mechanism 140.

Details of each of these structures are described below.

The first and second pivot shafts 111 and 121 are preferably formed of metal, and have an elongated cylindrical shape. The first and second pivot levers 112 and 122 are preferably formed of metal, and have a rectangular and thin plate shape.

A first end of the first pivot shaft 111 is coupled to a first end of the first pivot lever 112. A first end of the second pivot shaft 121 is coupled to a first end of the second pivot lever 122.

The first and second shaft supporting portions 113 and 123 are preferably formed of metal or plastic, and have a cylindrical bore shape. The first pivot shaft 111 is inserted into the first shaft supporting portion 113 so that the first pivot shaft 111 is pivotally supported by the first shaft supporting portion 113. The second pivot shaft 121 is also inserted into the second shaft supporting portion 123 so that the second pivot shaft 121 is pivotally supported by the second shaft supporting portion 123.

The first pivot cap 114 is attached to the first pivot shaft 111 or the first shaft supporting portion 113 so that grease is encased by the first pivot cap 114. The second pivot cap 124 is attached to the second pivot shaft 121 or the second shaft supporting portion 123 so that grease is encased by the second pivot cap 124. By providing the first and second pivot caps 114 and 124, fluid (e.g., rain water, melting snow, washing fluid, and the like) is prevented from splashing on or encroaching between the first pivot shaft 111 and the first shaft supporting portion 113, and between the second pivot shaft 121 and the second shaft supporting portion 123.

The first and second bar coupling portions 115 and 125 are preferably formed of metal or plastic, and are integrally formed with the first and second shaft supporting portions 113 and 123 so that they project outwardly from the sides of the first and second shaft supporting portions 113 and 123. The first and second bar coupling portions 115 and 125 are generally an elongated cylinder, for example, 23 mm in diameter, with a circular cross-section, and are coupled to both ends of the bar 130 by any suitable method of mounting such as press-fitting, swaging, or via threaded fasteners.

The first and second body mounting parts 116 and 126 are preferably formed of metal or plastic, and are integrally formed with the first and second shaft supporting portions 113 and 123. The first and second body mounting parts 116 and 126 are mounted on the cowl box 13 by, for example, bolts. As such, the first and second bar coupling portions 115 and 125 are maintained stationary relative to the cowl box 13 while the first and second pivot levers 112 and 122 are pivotable about the first and second pivot shafts 111 and 121.

The bar 130 is preferably formed of metal, and is generally an elongated straight cylinder, for example, 25 mm in diameter, with a circular cross-section that is cut to a predetermined length, for example, 300 mm.

The first bar coupling portion 115 is coupled to a first end 130*a* of the bar 130 by, for example, press-fitting or swaging. Also, the second bar coupling portion 125 is coupled to a second end 130*b* of the bar 130 by, for example, press-fitting or swaging.

As illustrated, the first and second bar coupling portions 115 and 125 may be inserted within both ends to enhance the interconnection therebetween.

As shown in FIG. 2, the link mechanism 140 includes first and second link rods 141 and 142. The first and second link rods 141 and 142 are preferably formed of metal although other materials may substitute therefor. The link mechanism 140 is pivotally connected to the first and second pivot levers 112 and 122.

As shown in FIG. 2, the second end 112*b* of the first pivot lever 112 is pivotally connected to a first end 141*a* of the first link rod 141. The second end 122*b* of the second pivot lever 122 is pivotally connected to a second end 141*b* of the first link rod 141. The second end 122*b* of the second pivot lever 122 is pivotally connected to a first end 142*a* of the second link rod 142.

As shown in FIGS. 2 to 5B, the wiper motor 150 includes a motor 151, and a housing 152 which is coupled to the motor 151. The wiper motor 150 is directly mounted on one side of the bar 130, and between the first and second bar coupling portions 115 and 125 by, for example, bolts and nuts. When the wiper motor 150 rotates in the predetermined range R1, the first and second levers 112 and 122 move in predetermined ranges R2, R3 and R4. Further, the first and second link rods 141 and 142 move back and forth with the first and second levers 112 and 122.

Figure 4:
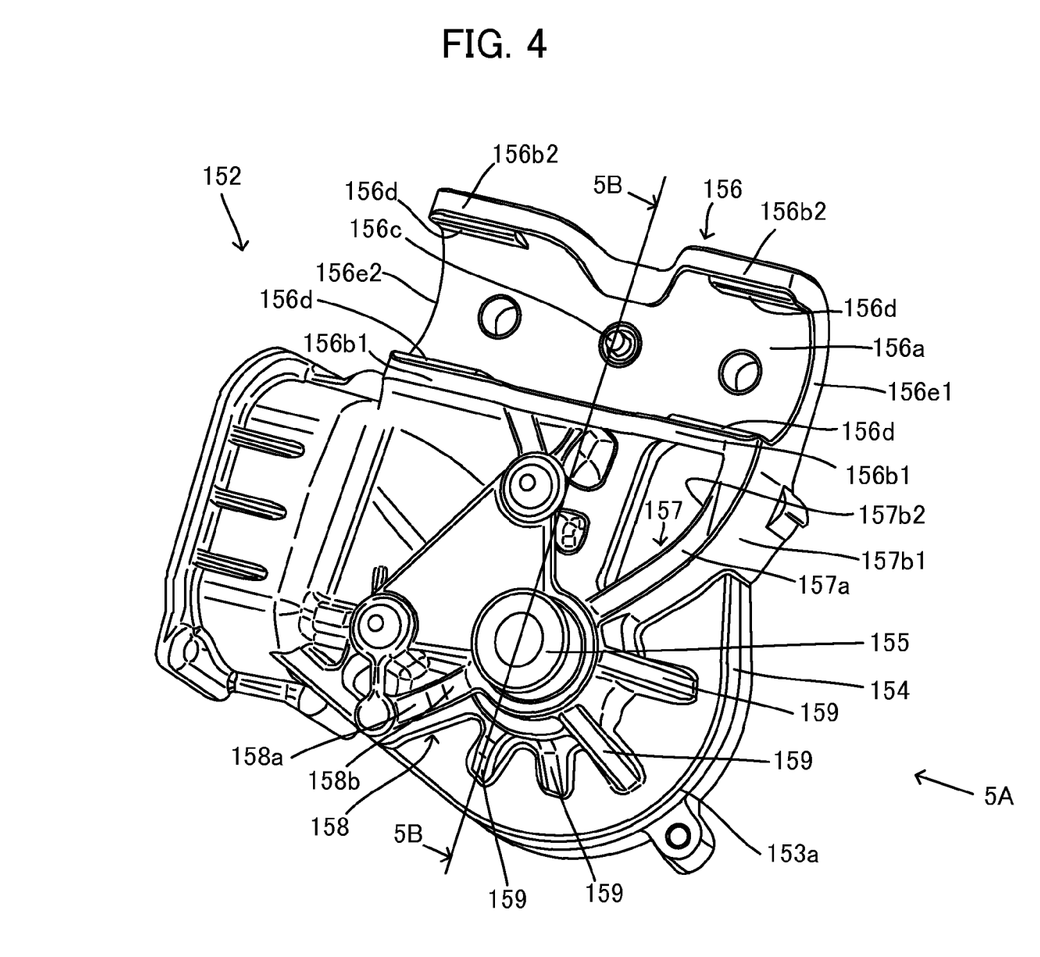
FIG. 4 is a perspective view of a gear housing of the wiper motor to the present invention.

The housing 152 is preferably formed of metal or plastic, and is integrally formed with a top surface 153, a side surface 154, a projection 155 and a mounting bracket 156. The top surface 153 has a shape which is a combination of a semicircle and a square.

Figure 5A:
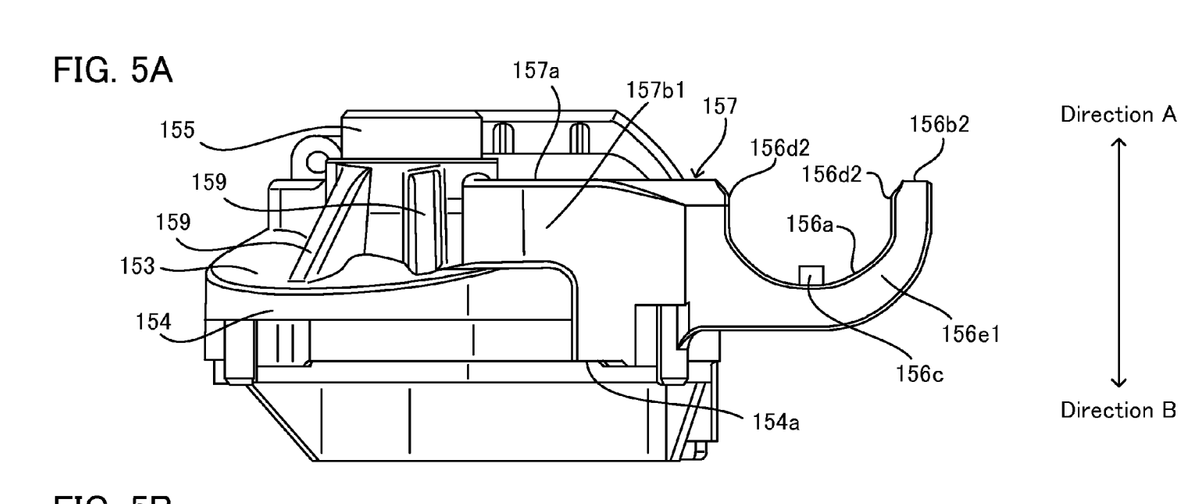
FIG. 5A is a side view of the gear housing as seen from the direction of an arrow 5A in FIG. 4.
Figure 5B:
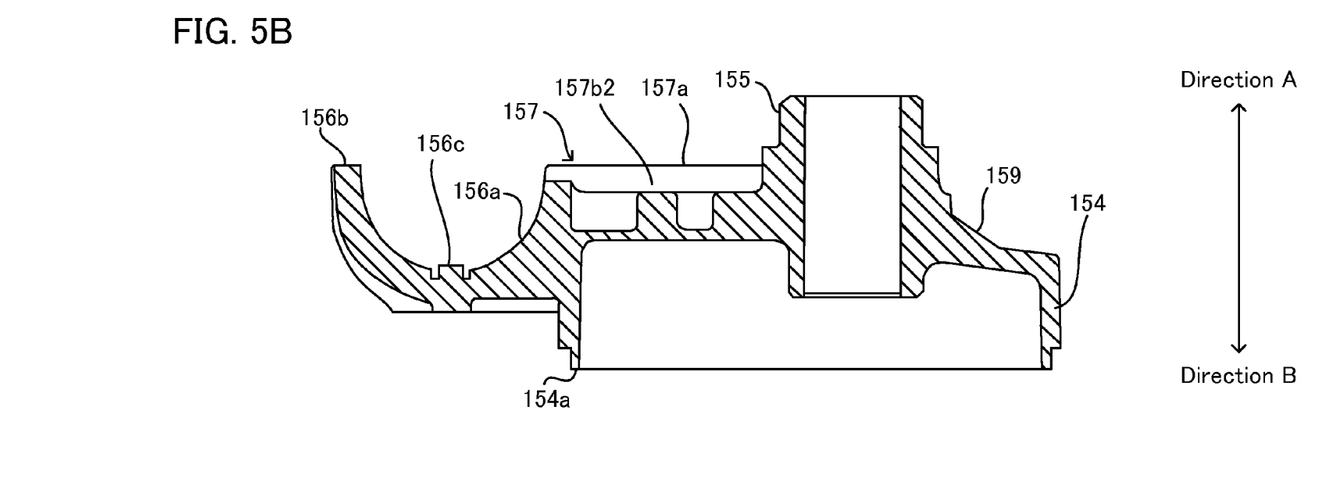
FIG. 5B is a sectional view of the gear housing taken along line 5B-5B in FIG. 4.

The top surface 153 includes a projection 155 which has a longitudinal cylindrical bore extending therethrough. As shown in FIGS. 5A and 5B, a first direction A is defined as a top direction for providing relative orientation of the top surface 153 in FIG. 5A. In this case, the direction A is defined as a direction which the projection 155 extends from the top surface 153. Also, a second direction B is defined as a bottom direction and is in an opposite direction relative to the first direction A. The side surface 154 extends from the edge of the top surface 153 in the second direction B.

The projection 155 is integrally formed with the housing 152. The projection 155 has a longitudinal cylindrical shape and extends from the top surface 153 in the first direction A. The projection 155 pivotally supports an output shaft 160. The projection 155 has, for example, a height of approximately 26 mm from the top surface 153.

The mounting bracket 156 is integrally formed with the housing 152 and is mounted to the bar 130. The mounting bracket 156 extends from the side surface 154. The mounting bracket 156 includes a generally semicylindrical surface 156*a*. The bar 130 is mounted onto the semicylindrical surface 156*a*, secured the mounting bracket 156 to the bar 130 by bolts 156*b* and nuts.

The mounting bracket 156 includes first and second top end surfaces 156*b*1 and 156*b*2 which lay in a plane perpendicular to the first direction A. The first top end surface 156*b*1 is located next to the side surface 154. The second top end surface 156*b*2 is spaced apart from the first top end surface 156*b*1. An inside edge of the second top end surface 156*b*2 is approximately 25.1 mm from an inside edge of the first top end surface 156*b*1.

Further, the mounting bracket 156 includes first and second longitudinal end surfaces 156*e*1 and 156*e*2. The first and second longitudinal end surfaces 156*e*1 and 156*e*2 lay in planes perpendicular to the longitudinal direction of the mounting bracket 156.

The first longitudinal end surface 156*e*1 is located near the side surface 154. The second longitudinal end surface 156*e*2 is located on the opposite side of the mounting bracket 156 relative to the first longitudinal end surface 156*e*1. The first longitudinal end surface 156*e*1 is approximately 77 mm from the second longitudinal end surface 156*e*2.

As shown in FIGS. 3 to 5B, the mounting bracket 156 also includes a boss 156*c* on the semicylindrical surface 156*a*. The boss 156*c* is located at a center of a long side of the mounting bracket 156. The boss 156*c* extends from the semicylindrical surface 156*a* in the first direction A. The boss 156*c* has a height of approximately 3 mm from the semicylindrical surface 156*a*. The boss 156*c* is approximately 62 mm from the center axis of the projection 155. When the bar 130 is mounted on the mounting bracket 156, the boss 156*c* inhibits longitudinal movement of the bar 130.

The mounting bracket 156 includes four projections 156*d* on the semicylindrical surface 156*a*. Each projection 156*d* is located at a corner among the first and second top end surfaces 156*b*1 and 156*b*2 and the first and second longitudinal end surfaces 156*e*1 and 156*e*2. The projections 156*d* contact with an outer periphery of the bar 130. The projections 156*d* prevent the bar 130 from rotating relative to the mounting bracket 156.

A rib 157 extends from the projection 155 to the mounting bracket 156 and extends from the top surface 153 of the housing 152 in the first direction A. The rib 157 includes a top end 157*a* and first and second side surfaces 157*b*1 and 157*b*2.

The top end 157*a* has a plane perpendicular to the first direction A. The top end 157*a* of the rib 157 and the first top end surface 156*b*1 of the mounting bracket 156 are preferably co-planar. The top end 157*a* has a height of approximately 13 mm from the top surface 153. The top end 157*a* has a constant width of approximately 5 mm. The first side surface 157*b*1 extends from the top end 157*a* to an end surface 154*a* of the side wall 154 in the direction B. The first side surface 157*b*1 has a height of approximately 28.5 mm from the top end 157*a* to the end surface 154*a*. The first side surface 157*b*1 has two heights of approximately 13 mm and 28.5 mm. The rib 157 is integrally formed with the mounting bracket 156. The first side surface 157*b*1 is located on the side of a border between the top surface 153 and the side surface 154. The second side surface 157*b*2 is located on an opposite side of the first side surface 157*b*1. The first and second side surfaces 157*b*1 and 157*b*2 are parallel curves. The first side surface 157*b*1 has a radius of approximately 35 mm. The second side surface 157*b*2 has a radius of approximately 30 mm. The first side surface 157b1 is approximately 5 mm from the second side surface 157b2.

The first side surface 157b1 is coextensive with the longitudinal end surface 156e1. The rib 157 also extends from the top surface 153 to the end surface 154a. The first side surface 157b1 has a common surface with the first longitudinal end surface 156e1.

The opposite rib 158 is located at an opposite side of the rib 157 and is essentially aligned therewith. The opposite rib 158 includes a first opposite rib 158a having a common plane with the top end 157a, and a second opposite rib 158b which inclines from the projection 155 to the first opposite rib 158a. The first opposite rib 158a has a constant width of approximately 5.5 mm. The first opposite rib 158a has a height of approximately 7.5 mm from the top surface 153. The second opposite rib 158b has an angle of approximately 155 degrees relative to the first opposite rib 158a. The opposite rib 158 extends from the projection 155 to the housing edge 153a.

Reinforcement ribs 159 are located on the top surface 153. The reinforcement ribs 159 extend radially outwardly from the projection 155 in a spoke-like manner. The reinforcement ribs 159 integrally extend from the top surface 153 in the first direction A, and radially extend around the projection 155 between the rib 157 and the opposite rib 158. In this embodiment, the reinforcement ribs 159 include four ribs and extend from the projection 155 at angles about equal to adjacent ribs 159. Each of the reinforcement ribs 159 has a generally triangular bar shape. Each reinforcement rib 159 has an angular range from about 20 degrees to about 45 degrees. Each reinforcement rib has a width of approximately 5 mm.

When the wiper motor 150 rotates in the presence of obstacles (e.g., snow and the like) at or near the end-of-stroke reverse positions, the housing 152 of the wiper motor 150 is resistant to high stresses among the top surface 153, the side surface 154 and the mounting bracket 156.

The windshield wiper assembly being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A windshield wiper assembly, comprising:
    a housing having a top surface and a side surface;
    a projection projecting in a first direction from the top surface, the projection having a through hole at a center of the projection, a longitudinal axis of the through hole being parallel to the first direction;
    a mounting bracket integrally extending from the side surface, the mounting bracket having:
        a first end boated at the side surface, the first end having:
            a first top end surface; and
            first and second longitudinal end surfaces opposite to each other;
        a second end located away from the side surface, the second end having:
            a second top end surface; and
            the first and second on longitudinal end surfaces; and
        a semi-cylindrical bottom connecting between the first and second ends, the semi-cylindrical bottom including the first and second longitudinal end surfaces; and
    a first rib integrally extending from the top surface in the first direction, the first rib integrally extending from a side of the projection to the first top end surface and the first longitudinal end surface of the mounting bracket in a first rib extending direction,
    wherein the rib has a constant height relative to the top surface from the side of the projection to the mounting bracket.

2. The windshield wiper assembly according to claim 1, wherein the first rib has a planar top surface.

3. The windshield wiper assembly according to claim 1, wherein the first rib has a top planar surface that has an equal height with the first top end surface of the mounting bracket relative to the top surface.

4. The windshield wiper assembly according to claim 1, wherein the first rib curves between the side of the projection and the mounting bracket in a plan view.

5. The windshield wiper assembly according to claim 1, wherein the first rib has first and second rib side surfaces, and the first rib side surface is coextensive with the first longitudinal end surface of the mounting bracket.

6. The windshield wiper assembly according to claim 5, wherein the first rib side surface has a rib bottom end surface, the first rib side surface extends in a second direction from the top surface of the housing so that the rib bottom end surface is shallower than the top surface of the housing.

7. The windshield wiper assembly according to claim 6, wherein the rib bottom end surface is perpendicular to the longitudinal axis of the through hole of the projection.

8. The windshield wiper assembly according to claim 7, wherein the rib end surface is shallower than the semi cylindrical bottom of the mounting bracket.

9. The windshield wiper assembly according to claim 1, further comprising:
    an opposite rib integrally extending from the top surface of the housing in the first direction, the opposite rib integrally extending from the side of the projection in an opposite rib extending direction opposite to the first rib extending direction.

10. The windshield wiper assembly according to claim 9, wherein the opposite rib has a top surface in a common plane with a top surface of the first rib.

11. The windshield wiper assembly according to claim 1, wherein the first rib extends to a housing bottom end of the side surface of the housing.

12. The windshield wiper assembly according to claim 1, wherein the mounting bracket is mounted to a bar so that the semi-cylindrical bottom of the mounting bracket abuts the bar.

* * * * *